J. H. CHAMP.
BOTTLING MACHINE.
APPLICATION FILED JAN. 16, 1907.

939,978.

Patented Nov. 16, 1909.
11 SHEETS—SHEET 1.

Witnesses:
A. L. Lord.
Jno. F. Oberlin

Inventor.
Joseph H. Champ,
J. B. Fay
Attorney.

J. H. CHAMP.
BOTTLING MACHINE.
APPLICATION FILED JAN. 16, 1907.

939,978.

Patented Nov. 16, 1909.
11 SHEETS—SHEET 4.

Witnesses:
A. L. Lord.
Jno. F. Oberlin.

Inventor.
Joseph H. Champ,
By J. B. Fay
Attorney.

J. H. CHAMP.
BOTTLING MACHINE.
APPLICATION FILED JAN. 16, 1907.

939,978.

Patented Nov. 16, 1909.
11 SHEETS—SHEET 8.

Witnesses:
A. L. Lord.
Jno. F. Oberlin

Inventor.
Joseph H. Champ,
By J. B. Fay
Attorney.

J. H. CHAMP.
BOTTLING MACHINE.
APPLICATION FILED JAN. 16, 1907.

939,978.

Patented Nov. 16, 1909.

11 SHEETS—SHEET 9.

Witnesses:
A. L. Lord.
Jno. F. Oberlin

Inventor.
Joseph H. Champ,
By J. B. Fay
Attorney.

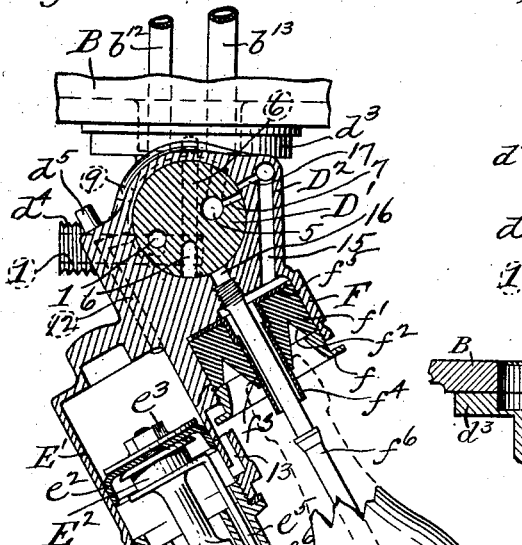

J. H. CHAMP.
BOTTLING MACHINE.
APPLICATION FILED JAN. 16, 1907.

939,978.

Patented Nov. 16, 1909.
11 SHEETS—SHEET 11.

Witnesses:
A. L. Lord.
Jno. F. Oberlin.

Inventor.
Joseph H. Champ
By J. B. Fay
Attorney.

UNITED STATES PATENT OFFICE.

JOSEPH H. CHAMP, OF CLEVELAND, OHIO.

BOTTLING-MACHINE.

939,978.

Specification of Letters Patent.   Patented Nov. 16, 1909.

Application filed January 16, 1907.  Serial No. 352,500.

*To all whom it may concern:*

Be it known that I, JOSEPH H. CHAMP, a citizen of the United States, resident of Cleveland, county of Cuyahoga, and State of Ohio, have invented a new and useful Improvement in Bottling-Machines, of which the following is a specification, the principle of the invention being herein explained and the best mode in which I have contemplated applying that principle, so as to distinguish it from other inventions.

My invention relates to improvements in the art of bottling, and has particular regard to the provision of an improved machine for filling bottles or other analogous vessels with liquids under pressure, such as beer or carbonated beverages. As will be obvious, however, the machine may be employed with equally satisfactory results in handling liquids not thus under pressure.

Said invention consists of the means hereinafter fully described and specifically set forth in the claims.

The annexed drawings and the following description set forth in detail certain mechanism embodying the invention, such disclosed means, however, constituting but one of various mechanical forms in which the principle of the invention may be used.

Figure 1:
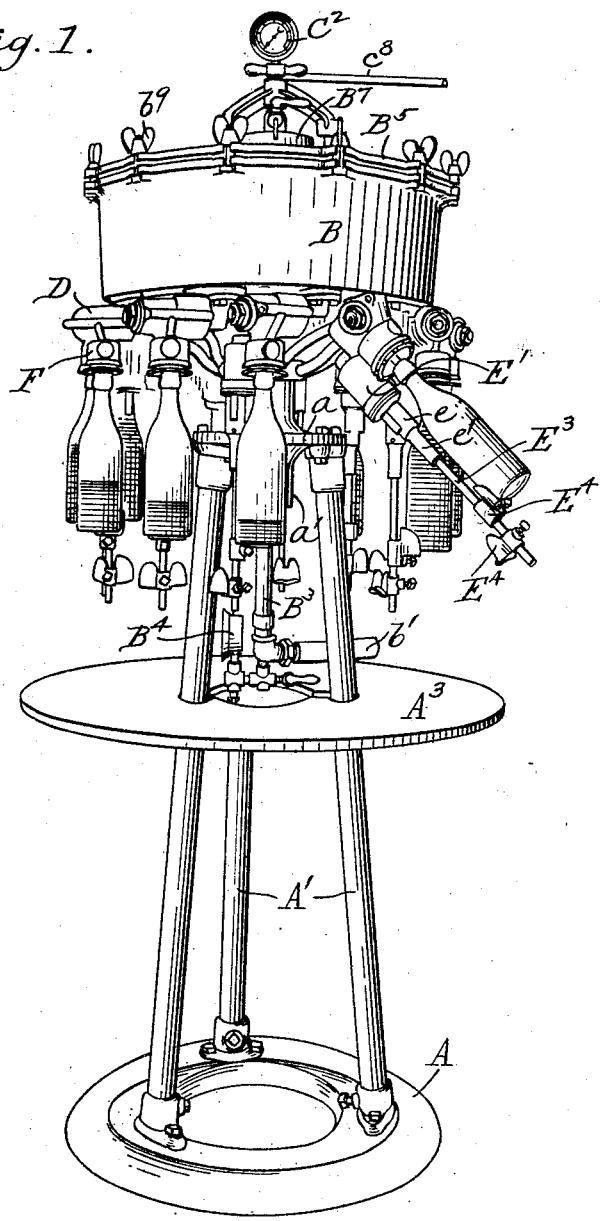
Figure 2:
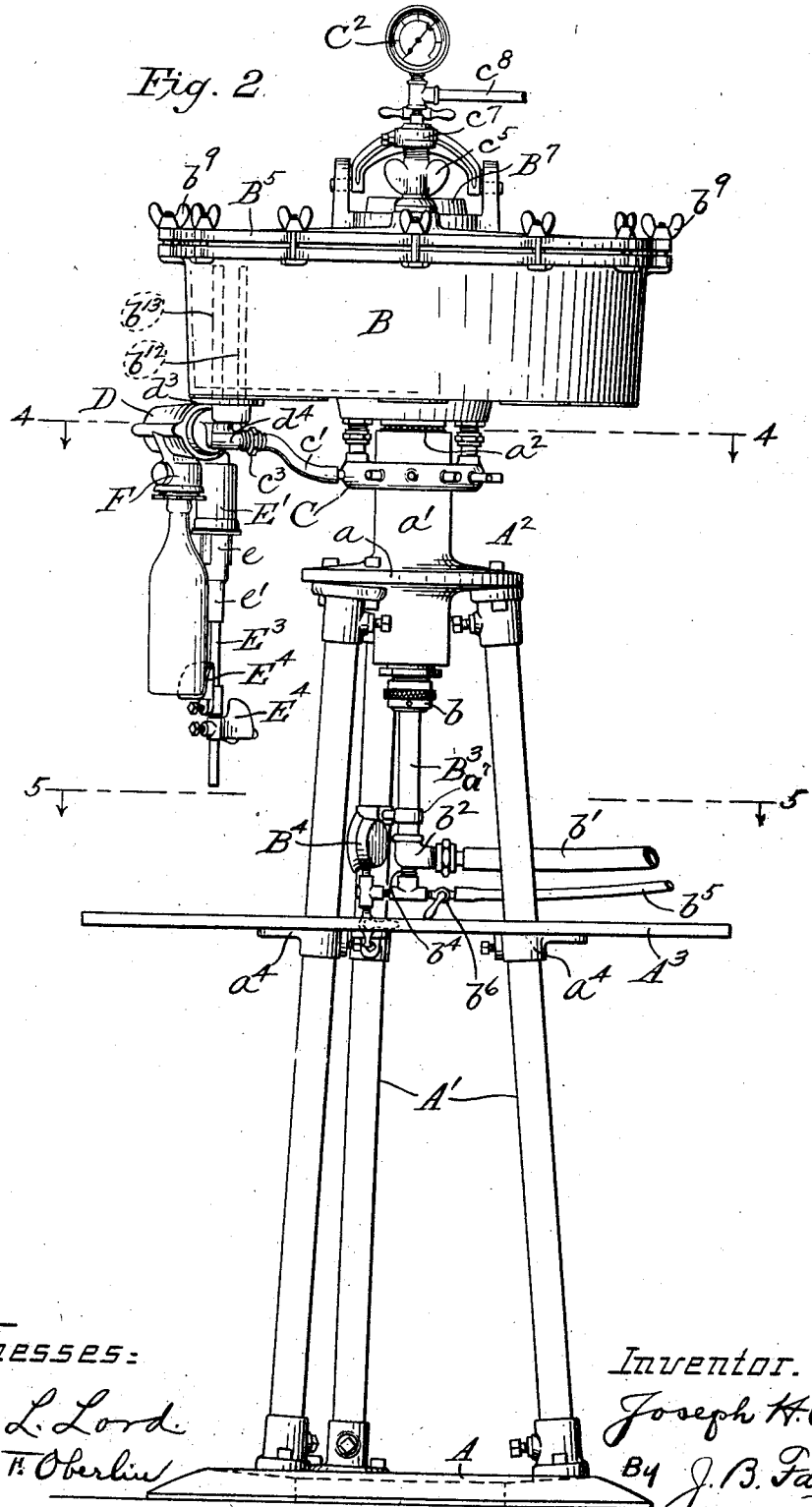
Figure 3:
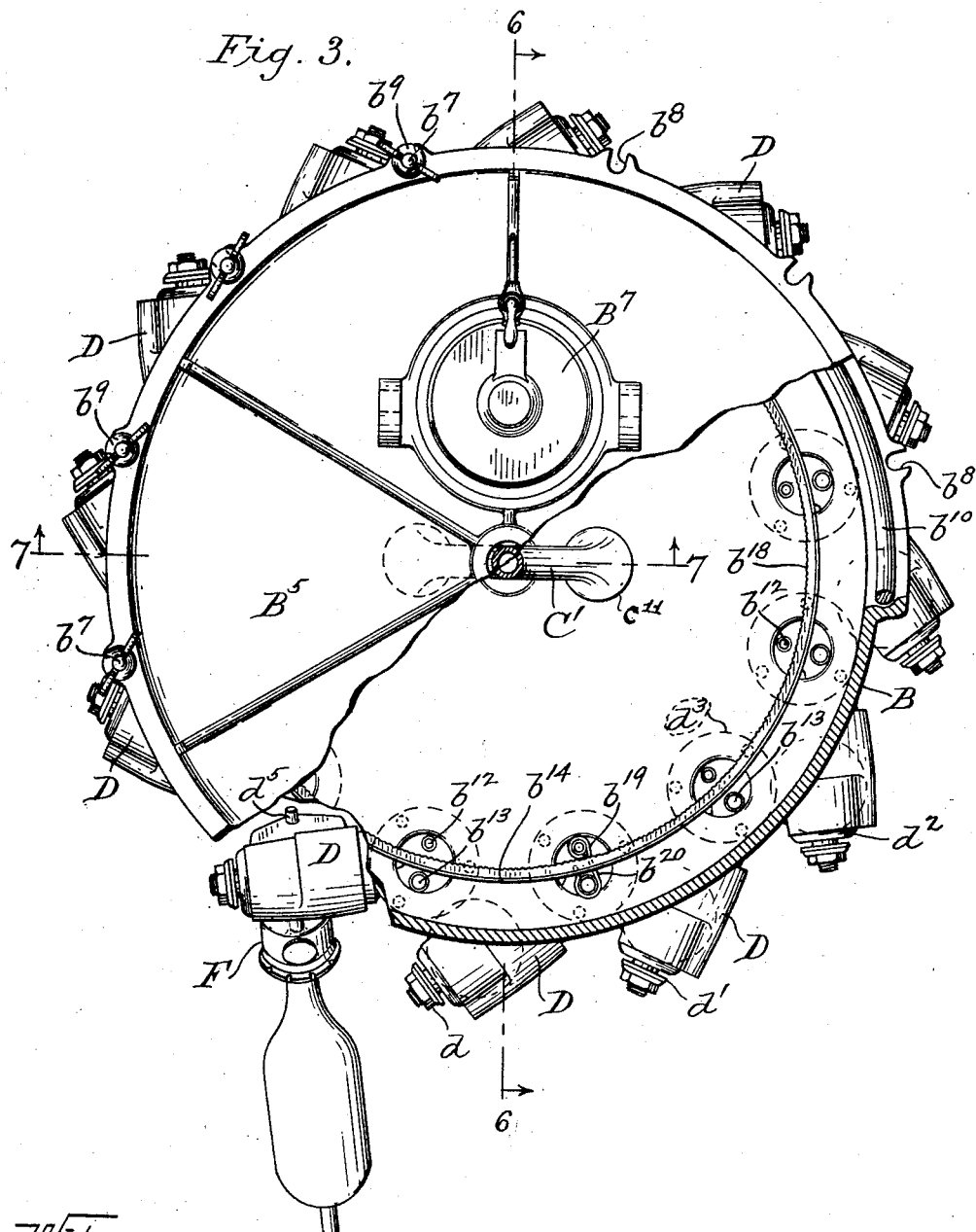
Figure 4:
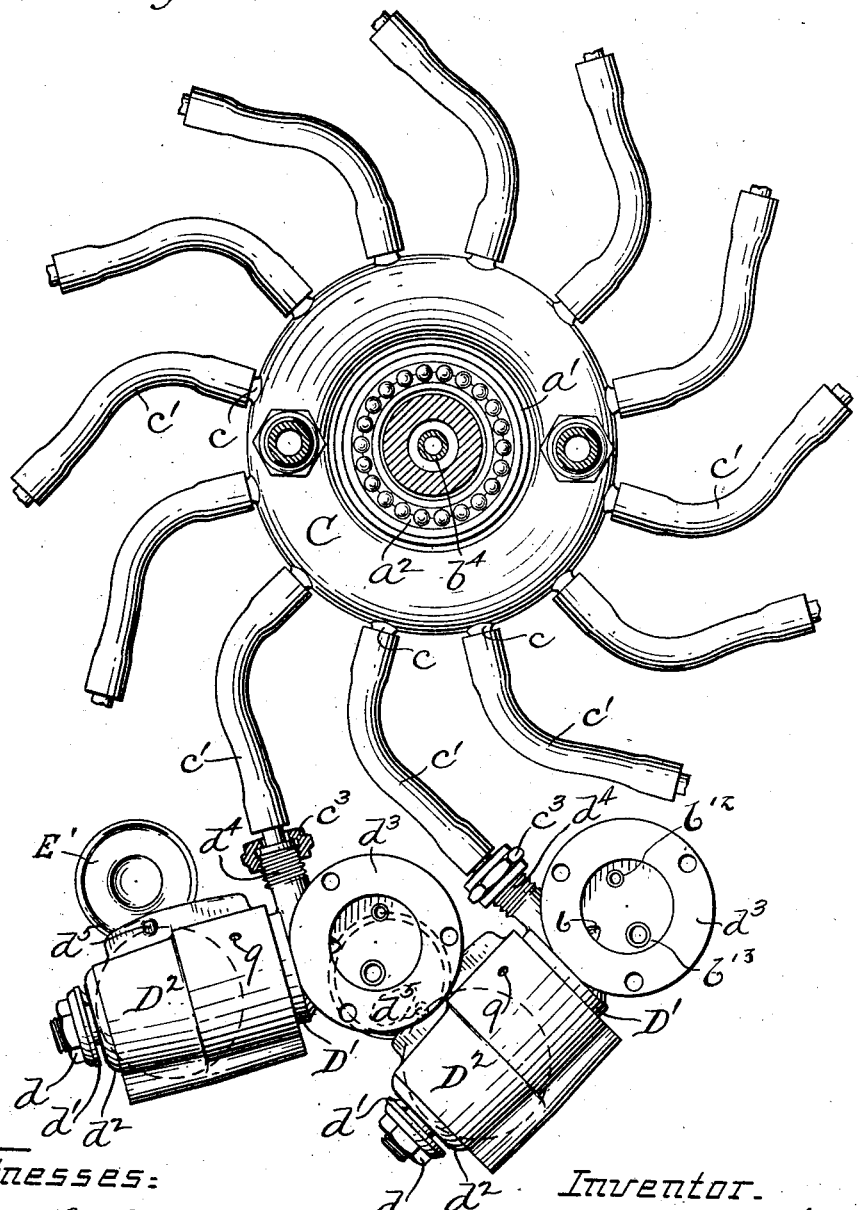
Figure 5:
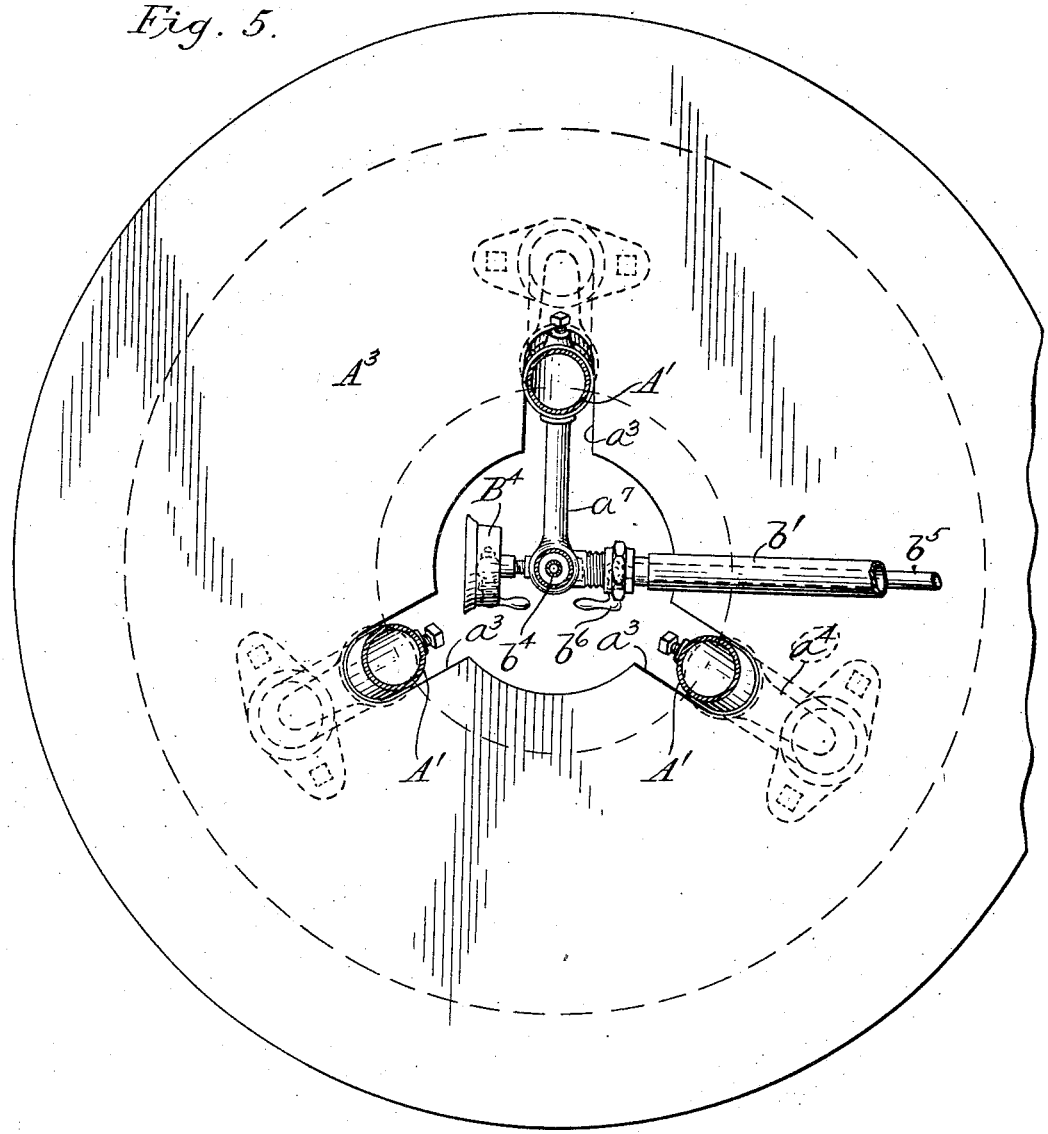
Figure 6:
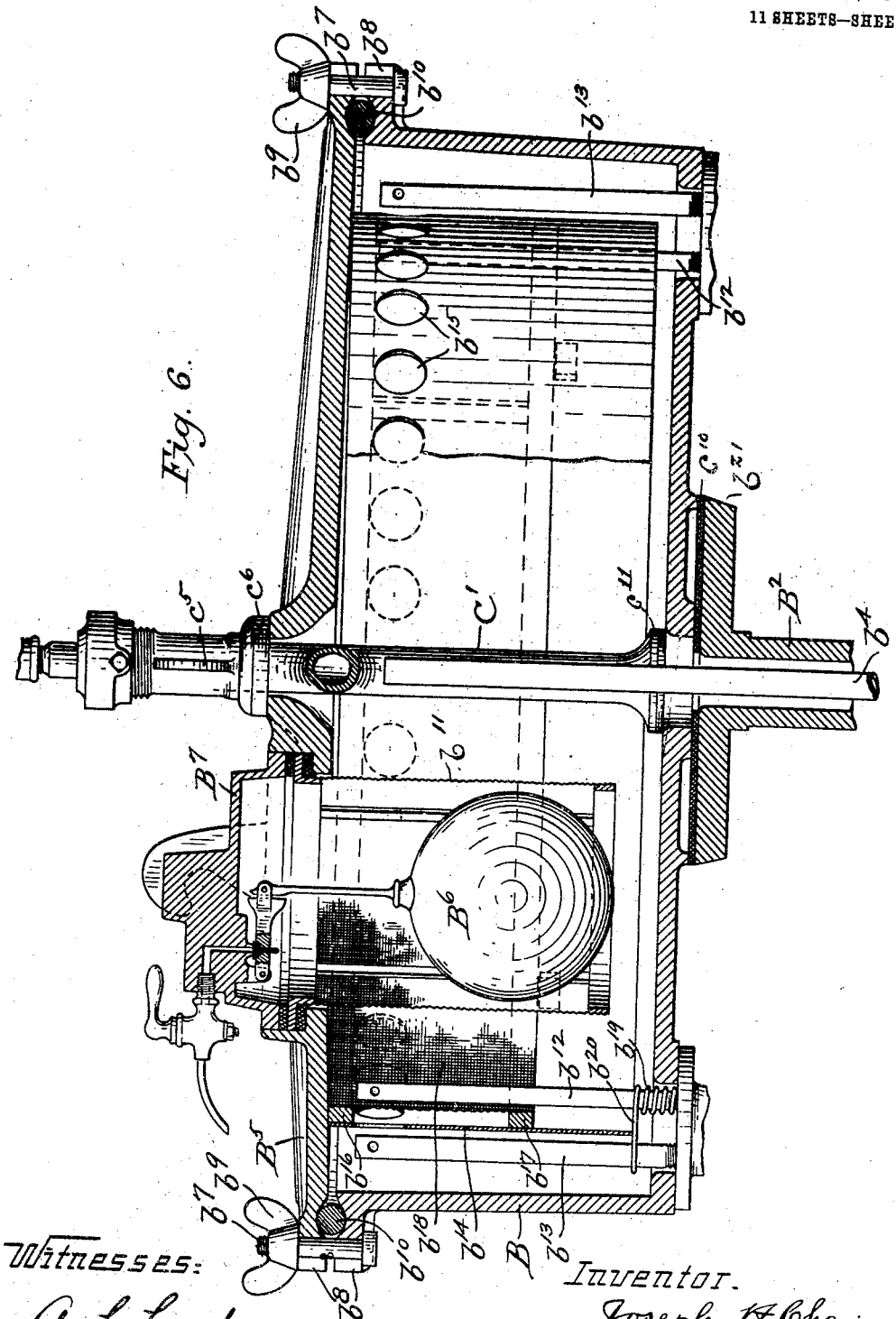
Figure 7:
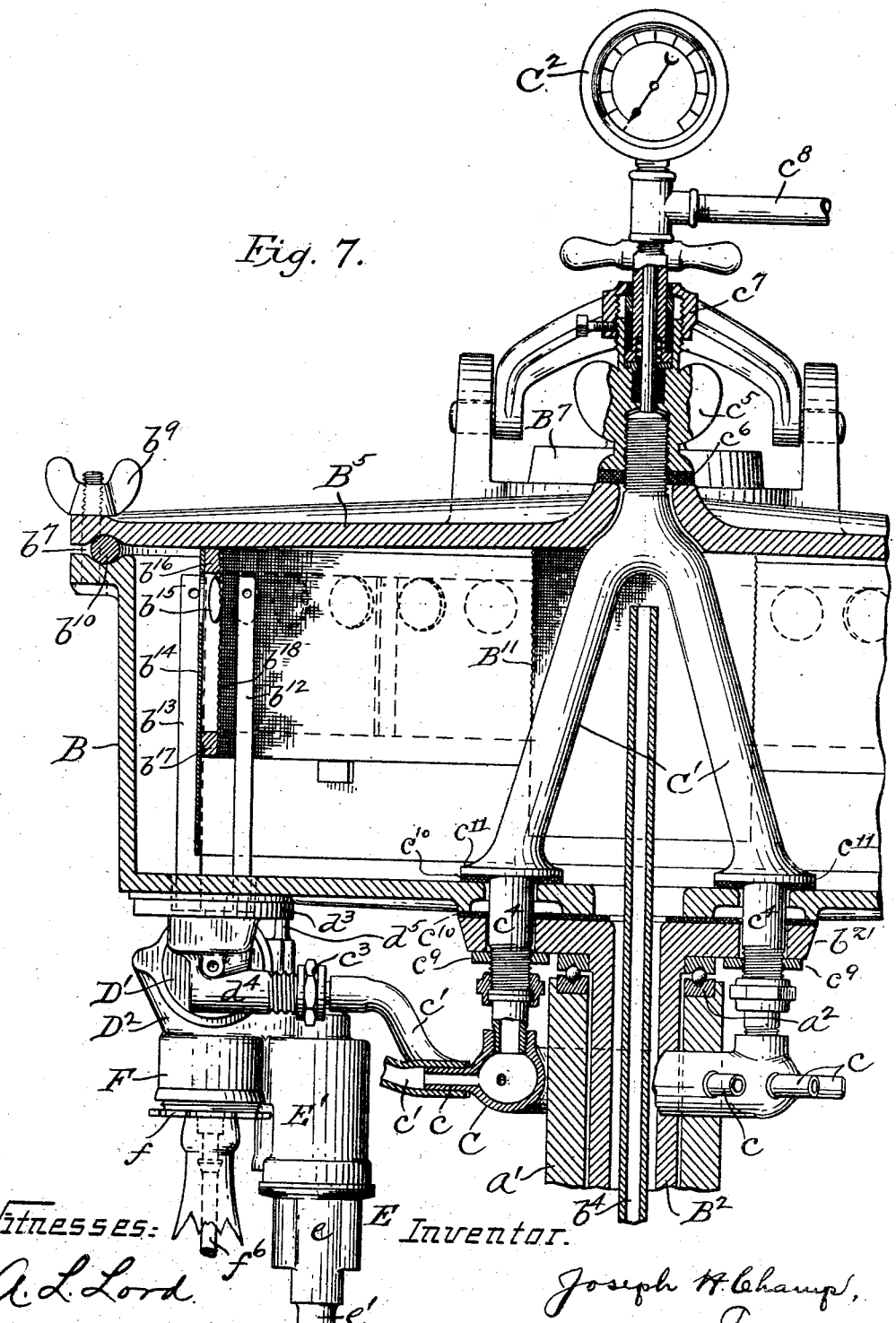
Figure 8:
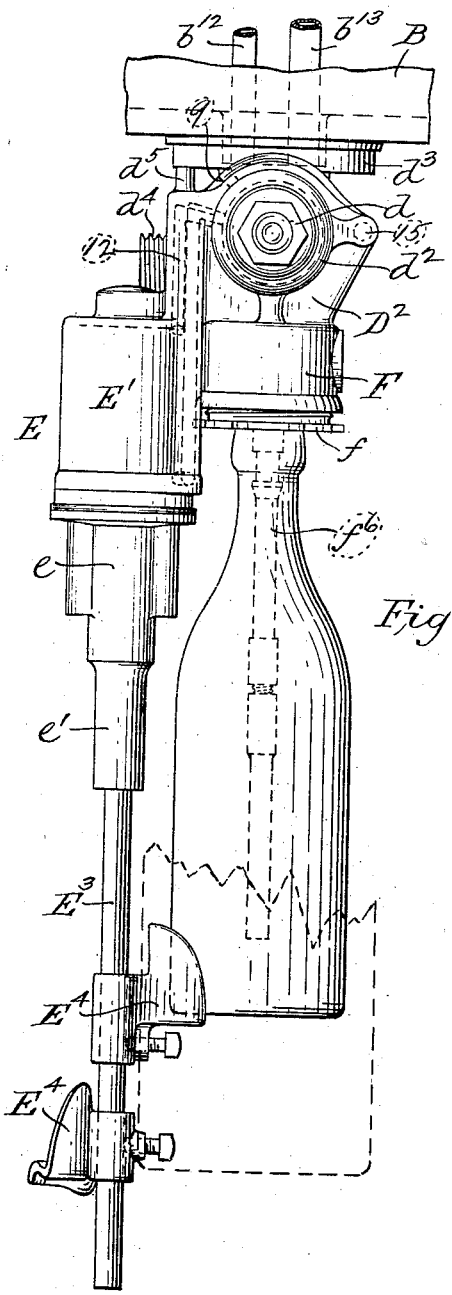
Figure 9:
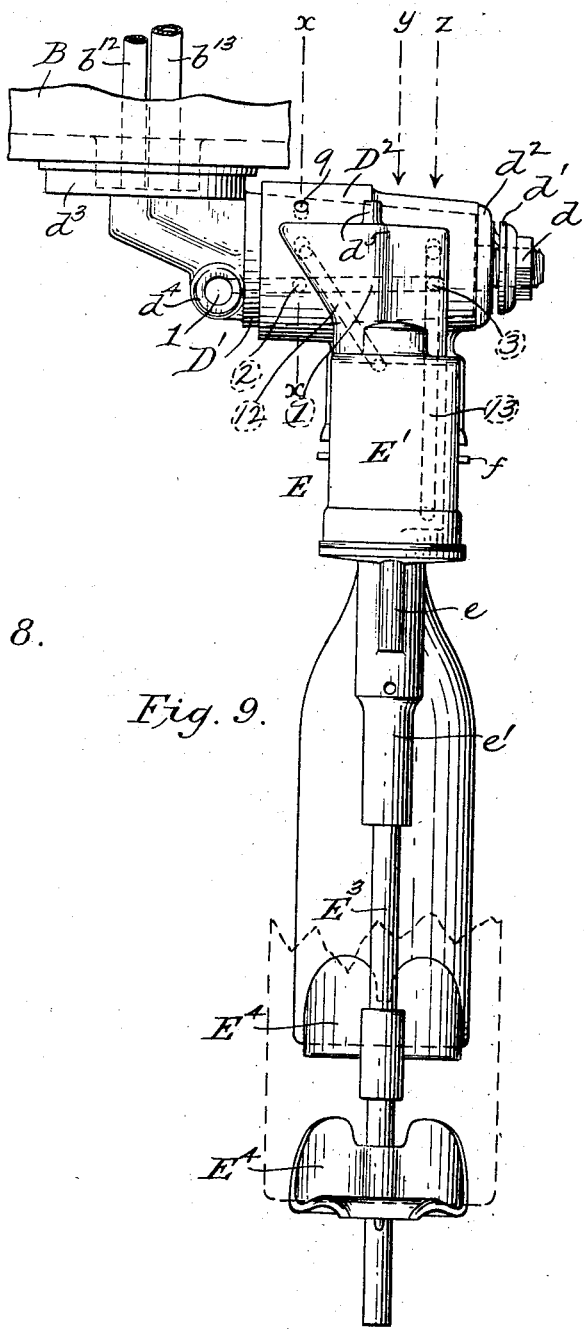
Figure 10:
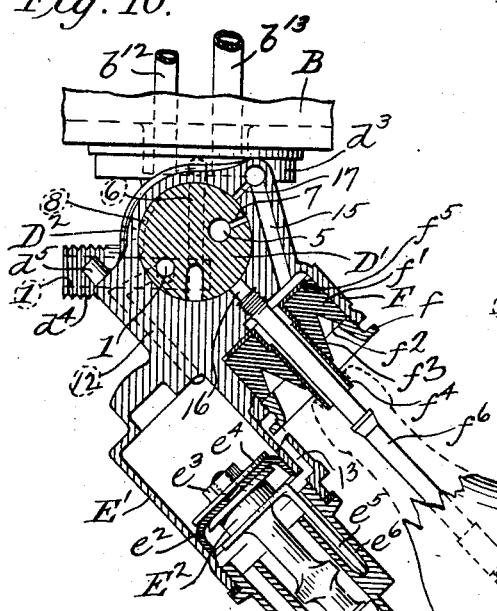
Figure 11:
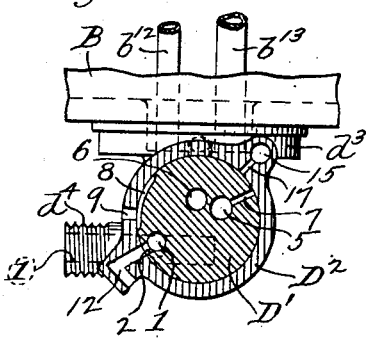
Figure 12:
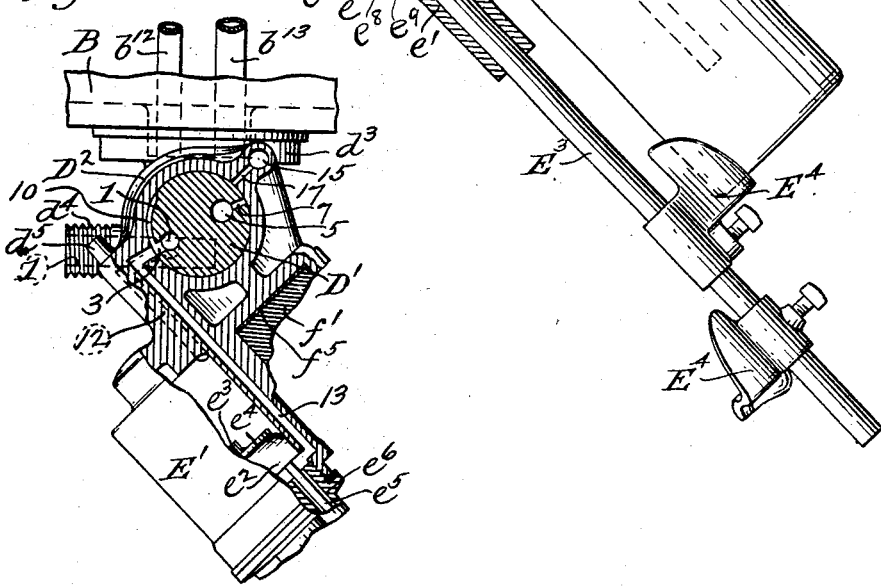
Figure 17:
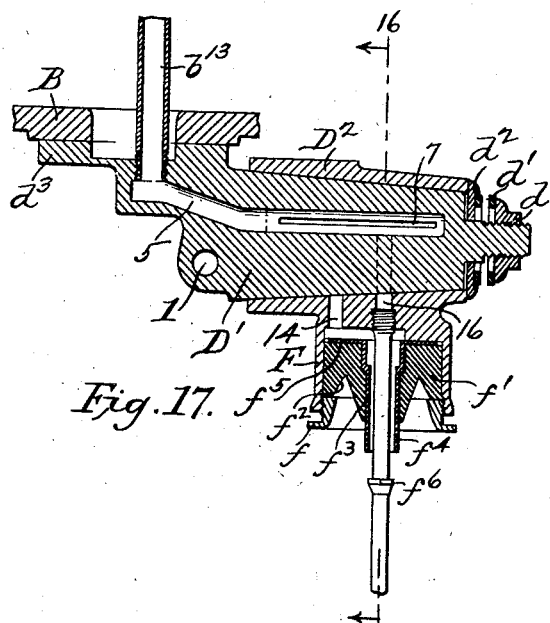
Figure 16:
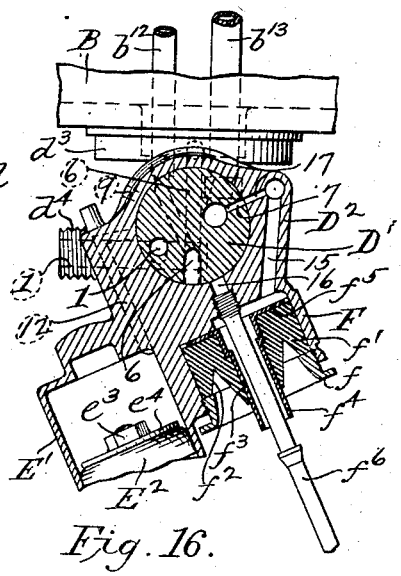
Figure 19:
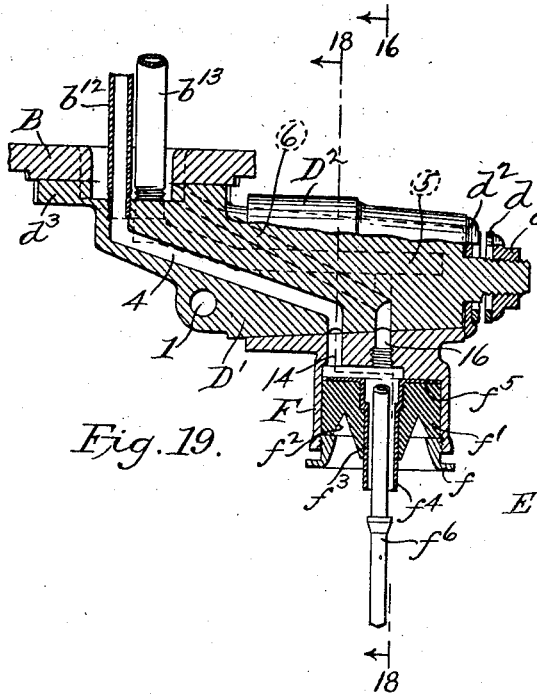
Figure 18:
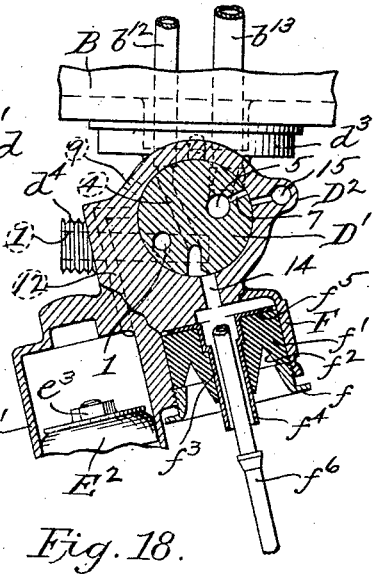

In said annexed drawings: Figure 1 is a perspective view of a machine embodying my several improvements; Fig. 2 is a side or front elevation of the same, certain elements of the structure being omitted in order not to confuse the view; Fig. 3 is a top plan view of the machine with parts broken away; Fig. 4 is a horizontal cross-sectional view taken on the line 4—4, Fig. 2; Fig. 5 is a similar horizontal cross-sectional view, taken on the line 5—5, Fig. 2; Fig. 6 is a vertical cross-section of a portion of the machine taken on the line 6—6, Fig. 3; Fig. 7 is a similar vertical cross-section taken at right angles to that shown in Fig. 6, *i. e.* on the line 7—7, Fig. 3; Figs. 8 and 9 are respectively a side and rear elevation of the bottle-filling-fluid distributing or bottle-filling device proper, in which the several parts thereof appear disposed as in their final operative position; Fig. 10 is a longitudinal cross-section of such distributing device and appurtenant parts, with portions appearing in side elevation, such parts disposed in the normal inoperative position of the device; Fig. 11 is a similar cross-section of a portion of such device with the parts in the same relative positions as in Fig. 10, such cross-section being taken on a plane passing through the line *x*—*x*, Fig. 9; Fig. 12 is a similar cross-section of the same parts, with the addition of a broken perspective view of an appurtenant cylinder and piston, such cross-sectional view being taken on a plane passing through the line *y*—*y*, Fig. 9; Fig. 13 is partly a longitudinal cross-section and partly a side elevation of such distributing or bottle-filling device, with the parts disposed as in the initial operative position of the device; Fig. 14 is a similar cross-section of a portion of the device in the said initial operative position, the cross-section being taken on a plane passing through the same line *x*—*x* as, and hence corresponding with, that appearing in Fig. 11; Fig. 15 is a cross-section and partial side elevation of the parts of the device as shown in Fig. 12, but occupying positions corresponding to the said initial operative position of the device as shown in Fig. 13; Fig. 16 is a cross-sectional view corresponding substantially with that shown in Figs. 10 and 13, the exact plane of the cross-section being indicated by the line 16—16, Fig. 17, and the parts of the distributing or bottle-filling device being shown in a second operative position; Fig. 17 is an axial cross-section of a portion of the device with the parts positioned as in Fig. 16; Fig. 18 is a view of the bottle-filling device corresponding substantially with that shown in Figs. 10 and 13, the exact plane of the cross-section being indicated by the line 18—18. Fig. 19, the parts of the device occupying the proper relative positions assumed in the third operative position of said device; Fig. 19 is an axial cross-section of the device in this third operative position, corresponding to that shown in Fig. 17 of such device in its second operative position; and Figs. 20 and 21 are respectively a corresponding transverse cross-section and an axial cross-section of said bottle-filling device in its fourth or final operative position, being the same as that shown in side and rear elevation in Figs. 8 and 9 respectively.

The various mechanisms and parts entering into the construction of my improved bottling machine are conveniently supported upon a frame, comprising a base or bed plate A on which are mounted three legs A' disposed to form a tripod and connected at 11 their upper ends by a cast metallic head $A^2$. Such head $A^2$ comprises a horizontally-disposed plate portion $a$, and integral therewith a vertical centrally-disposed tubular portion $a^1$ that extends some distance above and below the plate $a$. On the frame or stand thus provided is rotatably mounted a bottle-filling-fluid reservoir or tank B, such tank being shown in horizontal and vertical cross-section in Figs. 3 and 6, respectively, where it appears in the preferred circular form. Tank B is thus mounted on head $A^2$ of the frame or stand just described by being provided with a central downwardly-extending hollow shaft $B^2$ that is adapted to be inserted into the tubular portion $a'$ of head $A^2$ and when so inserted, to extend some distance below the lower end of the same. To facilitate the rotation of the tank upon the head, ball-bearings $a^2$ may be interposed between the tank bottom and the upper end of tubular portion $a'$ as shown, Figs. 2 and 7. The lower projecting extremity of tubular shaft $B^2$ is connected with an alined beer-supply pipe $B^3$ by means of a union-joint $b$ that is adapted to permit of a relative rotary movement between the two, the supply pipe being supported, as also held against rotation, by means of an arm or bracket $a^7$ secured to one of the legs $A'$. With such beer-supply pipe $B^3$, suitable flexible connection $b'$ is had with the general source of supply, as a keg, barrel or the like, not shown. The flexible connection $b'$ is not joined directly to pipe $B^3$, but by means of an elbow $b^2$, which elbow is provided in its vertically-disposed arm with a concentric pipe $b^4$ of smaller diameter lying within the same. This smaller inner pipe $b^4$ is connected, at its outer extremity, with a second flexible connection $b^5$ that leads from a suitable supply of compressed air or other suitable fluid. A cock $b^6$ permits the shutting-off of the supply of compressed air when desired, and a pressure-gage $B^4$ is connected with supply pipe $b^4$ for indicating the pressure attained. Such inner concentric pipe $b^4$ extends upwardly within beer supply pipe and tubular shaft $B^2$ to tank B, terminating in the upper portion of the latter, Figs. 6 and 7.

Tank B, which has already been described as being a receptacle of circular, that is of substantially cylindrical, conformation, is provided with a removable cover $B^5$. For the retention of this cover securely in place a plurality of peripherally-disposed set bolts $b^7$ are provided being seated in notches $b^8$ in the flanged rim of the tank and in the overlapping edge of the cover. A suitable gasket $b^{10}$ of rubber or like material is interposed between such tank rim and cover, Figs. 6 and 7, and the nuts $b^9$ are conveniently winged in order to facilitate the securing of an air tight closure.

Mounted within the tank and to one side of the center of the same is a suitable ball float $B^6$ adapted to actuate an air escape device $b^{10}$ with which the tank is provided, and by means of which the supply of beer to the latter is controlled. Such float and accessory parts are suspended from a supplementary cover $B^7$ detachably mounted on cover $B^5$ proper of the tank. The float is furthermore horizontally surrounded by a circular screen $b^{11}$ which depends from supplementary cover $B^7$ and wholly incloses the path of vertical play of the float. The lower portion of the screen terminates some distance above the bottom of the tank B, it being merely necessary, as will appear, for it to extend below the lowest level which it is designed the fluid in such tank shall attain.

Below tank B and surrounding the vertical tubular portion $a'$ of supporting head $A^2$ is an annular reservoir C, that is supported from such tank by means of two vertical tubes $c^4$ whereby connection is at the same time had with the lower ends of the bifurcated pipe C' within tank B. The support and connections for reservoir C, just described, are furthermore utilized to secure tubular shaft $B^2$ to the bottom of the tank. As shown in Fig. 7, the upper terminal of said shaft is provided with a wide flange $b^{21}$ through which the lower ends of bifurcated pipe C' pass. Such pipe ends being provided with collars $c^8$, adapted to rest on the tank-bottom within, and nuts $c^9$ on the lower projecting portions of the pipe branches, flange $b^{21}$ can be drawn tightly against the under side of the tank. Washers $c^{10}$ are, of course, interposed on both sides of the tank-bottom to further assure against leakage. This bifurcated pipe C' straddles compressed air supply pipe $b^4$ and its upper end extends centrally through the cover $B^5$ of tank B, a suitable winged collar $c^5$ and interposed gasket $c^6$ being provided to assist in making an air-tight joint at the point where such cover is pierced. The removal of the cover is by this means in no wise rendered difficult. The upper projecting end of pipe C' is joined to an extraneous fluid supply by means of pipe $c^8$ a suitable union $c^7$ being employed that is adapted to permit rotation of the end of the bifurcated pipe with respect to the supply pipe while still maintaining a tight joint. A gage $C^2$ is conveniently mounted attached to the external supply pipe near where it is thus joined to bifurcated pipe C'.

Within the beer-tank B are a plurality of pairs of tubes $b^{12}$ $b^{13}$ that project upwardly from the bottom of the tank to approximately the same height as that of the central compressed air supply tube $b^4$ already described. Such tubes $b^{12}$ $b^{13}$ respectively, form two concentric series near the outer wall of the tank and the members of each pair of corresponding tubes are connected at their lower ends with one of the distributing, or bottle-filling, devices as will hereinafter appear. Between such two series of tubes $b^{12}$ $b^{13}$ is located a circular partition $b^{14}$ that has its upper edge bearing closely and yet freely against the top of the tank. Near such upper edge partition $b^{14}$ is provided with a series of perforations $b^{15}$ that are adapted to permit free communication between the two concentric parts or chambers of the tank into which the partition obviously divides the same. Around its upper edge the partition is further provided with an inwardly projecting band $b^{16}$, and at a point about midway between perforations $b^{15}$ and the lower edge with a second band $b^{17}$. To these bands are respectively attached the upper and lower edges of a circular wire screen $b^{18}$, which screen, it will be evident, forms in effect a reticulated covering for the series of apertures $b^{15}$ in the partition wall $b^{14}$. The lower edge of such partition $b^{14}$ terminates a short distance above the bottom of the tank, being raised out of contact therewith and held with its upper edge against the tank cover by means of a series of springs $b^{19}$ that encircle the members of one series of tubes, and terminate with outwardly-projecting arms $b^{20}$. Upon these arms, the partition is resiliently supported, such arms being held against displacement by being hooked around the members of the other series of such tubes.

Equidistantly mounted about the periphery of tank or reservoir B are provided a series of bottle-filling members or distributing devices D, which I shall now proceed to more particularly describe. In this description I shall have regard to a single device, the others, the number of which will, of course depend upon the size or capacity of the machine, being but duplicates thereof. Each such distributing device D, then, comprises a supporting member D', Figs. 8, 9 and 21, in the form of a valve-plug, preferably of the usual truncated conical shape. Such valve-plug is formed laterally at its larger end with a flange or plate $d^3$ whereby it is supported from the under side of the tank bottom, screws or the like being utilized to attach such flange thereto. The axis of the plug is preferably disposed, for reasons that will later appear, at an angle other than radial, Fig. 3, to the circular path of movement which the distributing device, along with the periphery of the tank, describes as the latter rotates about its vertical axis.

Mounted upon valve-plug D' so as to be rotatable thereabout, is a tubular valve member $D^2$ that is retained upon the plug by means of a nut $d$ threaded upon the outer end of the latter, a spring $d'$ and washer $d^2$ being preferably introduced between such nut and the end of the valve in order to maintain a sufficiently close frictional contact between such valve and the plug to cause the former to remain in whatever position it may be placed with reference to the latter. Attached to such valve $D^2$, so as to be rotatable therewith about valve-plug D' as an axis, is a bottle-holding device E and a bottle-mouth-piece F, Figs. 8 and 9. In fact, I preferably form in practice the base structure of these devices integral with such valve. Bottle-holding device E comprises a cylinder E', whose axis lies substantially at right angles to the axis of oscillation of the device as a whole. The lower end of this cylinder comprises an elongated cylinder head $e$ that is formed with an integral stuffing box $e'$ adapted to accommodate the rod $E^3$ of a differential piston $E^2$, reciprocably mounted in the cylinder. Piston rod $E^3$ extends downwardly for some distance below the lower end of the cylinder. The two pistons of unequal size constituting differential piston $E^2$ may be of any approved construction; as shown, the upper larger one $e^2$ comprises a cup-shaped leather washer secured onto the flattened end of the piston-rod by means of a nut $e^3$ and washer $e^4$, while the lower one $e^9$ comprises simply a heavy rubber ring or washer secured upon the piston-rod $E^3$ between suitable collars $e^{10}$, Figs. 10 and 13. Projecting downwardly from such flattened end of the piston-rod and parallel with the latter is a pin $e^5$ that is adapted to register in any one of a plurality of apertures $e^6$ formed laterally of that portion of the head $e$ of the cylinder in which the smaller piston $e^8$ reciprocates, as clearly shown in the figures last referred to. In the particular device here utilized for illustrative purposes, two such apertures $e^6$ are provided. These apertures and projecting pin $e^5$ are of such a length that the latter can become disengaged from the former only when the piston-head is raised to its extreme upper position in cylinder E'. This position, as will be evident later, is not attained in the course of the normal operation of the piston. In other words, within the limits of its normal stroke, the piston is held, by the means just described, against any movement other than a longitudinal one. However, when desired, by raising the same into the extreme upper position just described, it obviously may be partially rotated, and then again secured against any but such longitudinal movement in this new axial position.

Upon the downwardly-projecting piston-rod $E^3$ are adjustably mounted one or more bottle-rests or stirrups $E^4$ of any approved design. In the device in hand, it is contemplated that two such stirrups can be conveniently utilized, one to receive pint bottles, the other quart bottles. Such stirrups, Figs. 8 and 9, would be suitably spaced apart upon the piston-rod and would be disposed diametrically opposite each other with respect to the axis of the latter, such axial position being such as to cause first the one, then the other, to be presented in an operative position, upon the piston being locked in first the one, then the other, of its two possible operative positions, wherein it is held, as stated, within the limits of its normal stroke against any but a longitudinal movement.

A bottle, properly seated upon the corresponding rest or stirrup, is designed to be raised by the latter upon the upward movement of the piston and piston-rod into engagement with bottle mouth-piece F. This mouth-piece, Figs. 8, 10 and 13, is of substantially inverted cup-shape, there being retained within the same, by means of a threaded washer $f$, a rubber gasket $f'$ having an annular groove $f^2$, of V-shape in cross-section, on its under side, and a central opening $f^3$. Fitted in opening $f^3$ and projecting therethrough for a short distance is a tube $f^4$ such tube being retained in place by having its upper end flanged to form a washer $f^5$ that is clamped between gasket $f'$ and the upper end of the mouth-piece cup. This tube $f^4$ communicates with passages in valve-member $D^2$ and valve-plug $D'$, as will be presently set forth. Located within such tube $f^4$ is a second tube $f^6$ of smaller diameter through which the liquid, wherewith the bottle is designed to be filled, may be conducted into the interior of the latter. Such tube is preferably of sectional jointed construction, Fig. 8, whereby it may be utilized for filling either large or small-sized bottles, as the case may be.

As need scarcely be explained since it is well understood in the art, it is desirable, where bottles or like vessels are being charged with liquids under pressure, such as beer and carbonated beverages, that prior to the introduction of the liquid into the bottle the air in such bottle should be put under pressure equal to that sustained by the liquid. Upon the latter being thereupon delivered into the bottle, the force of gravity alone will act, there will be no expansion of the gases dissolved in the liquid, and foaming and the other disagreeable consequences that would be entailed are practically eliminated. I have accordingly designed distributing device D, to thus subject the air within a bottle placed upon stirrup E to an equal pressure with that sustained by the liquid wherewith the bottle is to be filled preliminarily to admitting such liquid thereto; and during the filling operation provision is made for permitting the escape of such air. These results I effect by means of the coöperative action of valve-plug D' and tubular valve $D^2$ oscillatory thereabout. To this end such valve plug and valve are provided with connections and passages as follows: There are as many pair of tubes $b^{12}$ $b^{13}$ which it will be recalled have been described as being disposed in two concentric series near the outer wall of the tank B, as there are distributing devices D. The members $b^{12}$ $b^{13}$ of each such pair are respectively connected with passages 4 and 5, Figs. 10 to 21, inclusive, that extend substantially horizontally through the valve plug D' of the corresponding distributing device and terminate in openings in the outer curved surface thereof. Of such openings that of passage 5 is in the form of a slot 7 extending very nearly the entire length of the plug. A third passage 6 in said plug, similarly disposed and terminating, leads directly from the bottom of the tank, an opening for this purpose being provided in the flanged portion $d^3$ of the plug that is secured against such bottom of the tank. Connection between the plug and actuating-fluid reservoir C, is had by means of a tube $c'$ secured at its inner end upon a nipple $c$ radially projecting from said reservoir, and at its outer end, by a union $c^3$, with an apertured boss $d^4$ that projects laterally from the rear of valve-plug D'.

Communicating with the aperture in boss $d^4$ is a passage 1 that like passages 4, 5 and 6, extends longitudinally of the valve-plug, but that has two openings 2 and 3, leading therefrom to the outer curved surface of the plug. Continuous with the latter of these openings, 3, is a short transversely disposed groove 10. A second groove 8 similar to groove 10 is provided also on the surface of said plug near its larger end but is not connected with any passages in the latter, being designed to connect, as will appear, the openings of two passages 9 and 12 in the valve D'. Of such two passages 9 and 12 in the valve the former constitutes simply a vent opening into the outer atmosphere, while 12 leads into the upper end of the piston chamber in cylinder E' and is adapted, in a proper relative position of valve and plug, to register with opening 2 in the latter. A corresponding passage 13 leads to the lower end of the piston chamber and is adapted to similarly register with openings 3 in the plug. Communicating with the short central tube $f^4$ in bottle mouth-piece F are two passages 14 and 15, respectively adapted to register with the openings of passages 4 and 5 of the plug. Of these two passages 14 and 15 the latter terminates on the inner curved surface of the valve in an elongated opening 17 corresponding with the elongated opening or slot 7 that characterizes passage 5 of the plug. Yet another passage 16 in said valve-member $D^2$ communicates with the filling tube $f^6$, that lies within such central tube $f^4$ in the bottle mouth-piece, and is adapted to register with passage 6 in the valve-plug. The latter, it will be remembered, connects directly with the bottom of the beer-tank.

The disposition of the aforesaid passages need not be more explicitly described, inasmuch as such distribution will be readily obvious from the description which I now propose to give of the filling operation, reference being had to the aforementioned series of Figs. 10 to 21, inclusive, for showing the manner in which these passages in the plug D' and valve $D^2$ coöperate to effect the several desired results incidental to the filling operation. Referring, then, to Figs. 10, 11 and 12, it may be stated that the parts are there shown as occupying their normal inoperative positions. Such positions correspond with an inclined position of the valve-member D' and appurtenant parts, including the bottle-holding device E and bottle-mouth-piece F, with reference to a perpendicular passing through such valve-member's axis of oscillation. In such position of parts, piston-rod $E^2$ occupies its lower position in cylinder E', both passages 12 and 13 being connected with passage-way 1 in the valve-plug which communicates with the actuating fluid reservoir C, whereby an equal pressure is maintained on both sides of the piston-head $e^2$ leaving the effect of the pressure on piston-head $e^3$ alone to act, and thereby maintaining piston $E^3$ in its lowermost position. No other passages in said valve and valve-plug are in register at this juncture. It is while the device is in this position, that the bottle to be filled is manually approached thereto. In thus approaching the bottle, filling tube $f^6$ is inserted into its mouth, whereby the latter is brought into alinement with the bottle-mouth-piece F, and the bottom of the bottle thereupon stepped into stirrup $E^4$, in which position the bottle shown in Fig. 10 appears.

The operator having thus placed the bottle in position, completes in succession the following steps of the filling operation by a single continuous rotative movement of the valve and the aforesaid appurtenant parts about said valve's axis of oscillation. At the conclusion of this movement such appurtenant parts are substantially vertically-disposed, Figs. 8 and 9, or are, in other words, parallel with the axis of rotation of the machine as a whole. The rotative or oscillatory movement of the valve and appurtenant parts about its individual axis is limited when this position is attained by the engagement of a lug $d^5$ on the upper side of the valve with the under side of the tank or reservoir B, Fig. 8. While this operation, as has been described, is a continuous one and very quickly performed, it may be resolved into four distinct successive steps. In the first of these, the one presented in Figs. 13, 14 and 15, it will be observed that while passage 13 still remains in communication with passage-way 1 in the valve-plug by virtue of the slot 10 continuous, as has been described, with the opening 3 of said passage 1, passage 12 has been cut off from this connection and is brought into connection with the second peripheral slot 8 in the valve-plug, and thereby with vent 9. The result of the connections just described will obviously be an upward actuation of piston $E^2$, owing to the differential effect of the pressure on the under side of piston-head $e^2$ and on the upper side of the smaller piston-head $e^3$. By this action the mouth of the bottle, as shown in Fig. 13, is raised and held tightly against the grooved gasket $f$ in bottle mouth-piece F. Immediately thereafter, in what may be termed the second operative position of the device, Figs. 16 and 17, the two elongated slots 7 and 17 in plug D' and valve $D^2$, respectively, are brought into register and the bottle interior thereby momentarily put into communication, through upwardly projecting tube $b^{13}$ in tank B, with the stratum of compressed air or other gas supernatant upon the beer or other bottle-filling-fluid contained in such tank. Immediately upon this connection being shut off, during which connection, however, in spite of its brevity, the pressure of the air within the bottle has been raised to that of the air in the tank, connection is had in the third operative position of the parts, Figs. 18 and 19, between passage 16, which latter, as has been described, connects directly with depending bottle-filling tube $f^6$, and passage 6 in the valve-plug that leads to the bottom of beer-tank B. This connection begins a trifle before the aforesaid vertical, or final operative, position is attained, and is continued pending the retention by the device of the latter position, Figs. 20 and 21. At the same time, the central opening $f^4$ in the bottle-mouth-piece F has its connection with the upper portion of beer-tank B restored by the register of passage 14 with passage 4, by virtue of which, it will be obvious, that as fast as the liquid from the tank can, by gravity, flow into the bottle through the bottle-filling tube, the displaced air can escape into the upper portion of such tank. This flow of liquid and escape of air continues until the bottle is filled. Pending the last three steps in the operation, the connection last described of the two ends of the piston-chamber remains unchanged. In other words, the pressure of the actuating fluid in reservoir C resists any pressure exerted upon the bottle through the bottle-mouth-piece and maintains a close contact between the bottle and the latter.

To remove the bottle thus filled, all that is required is a reverse rotation or oscillation from that just set forth, whereby, disregarding the several connections intermediately effected with the passages leading to the bottle, since the latter are ineffective, an equilibrium of pressure on the two sides of piston-head $e^2$ in piston-chamber E' is restored. The latter thereupon gently sinks into its original inoperative position, shown in Fig. 10, due to the pressure of the air on lower piston-head $e^8$, now again become effective, and to the weight of the filled bottle upon the rest or stirrup $E^4$ borne thereby. The bottle may then be removed and disposed of as seen fit.

In the operation, as thus described, it will be observed that no attention is required to be paid to the piston means whereby the movable bottle-rest is actuated. Such actuation is entirely automatic and is controlled by the same coöperative action of valve and valve-plug that is utilized to effect first the compression of the air in the bottle and then its filling with the beer or other liquid. Such actuation in other words occurs upon the conjoint oscillatory movement of the bottle rest and bottle-mouthpiece about valve plug D'.

As has been stated, a plurality of distributing devices, such as has just been described, are provided, there being an even dozen in the machine here illustrated. The axis of oscillation of each of these devices is disposed, as has been indicated, at an angle to the circular path of travel of such device, such angle being preferably one intermediate of a radial and a tangent line to said circle. The object of this arrangement is that, by the aforesaid oscillation of the successive filling devices, a rotative tendency will be given to the machine as a whole sufficient to maintain the desired movement of the latter, whereby one device after the other will be presented to the operator running the machine at natever point thereabout he may be stationed. As they are thus successively presented the filled bottle is removed and set aside and an empty one inserted in its place. A single movement of the hand will in each case accomplish the entire operation, and in addition in the latter instance will advance the machine to present another filled bottle. With the exercise of a little skill and ambidexterity on the part of the operator bottles may obviously be handled with considerable rapidity.

To facilitate the handling of the bottles I provide a table $A^3$ in connection with the tripod stand that is utilized to support the filling machine proper. This table is preferably of circular outline and is mounted so as to be vertically adjustable of the stand by being formed with a central opening from which radiate notches $a^3$ corresponding in their disposition with that of the legs A' of the stand. Brackets $a^4$ slidably secured on such legs, respectively, are adapted to support the aforesaid table at any desired elevation, to suit the convenience of the operator in view of the particular size of bottle that he may be engaged in filling.

In establishments where machines of the character here described are employed, seldom more than two sizes of bottles require to be handled, such two sizes being pints and quarts, respectively. I have already explained how that the piston rod $E^3$ and bottle rest $E^4$ supported thereby are normally locked against any but longitudinal movement. Such locking, by some means or other, is more or less essential even where but a single stirrup or rest is provided for otherwise owing to an accidental partial rotation of the piston rod the bottle would be held askew and the necessary air-tight junction with the mouth-piece endangered. By the unique device which I provide for effecting this result it is possible to thus lock the piston rod in more than one position and by having stirrups mounted to correspond, the need for a readjustment of the latter every time it is desired to change from one style of bottle to another is avoided. As it is, all that is necessary is that the rod be raised until projections $e^5$ are disengaged from apertures $e^6$ whereupon the whole may be rotated to occupy its new position. It obviously will require but a few minutes to thus change the whole set of distributing or filling devices, and once the stirrups have been properly adjusted there will be slight further danger of one working out of alinement no matter how often the change just described be made.

The ball float $B^6$ with the connected air escape device, which it is designed to operate, provides automatic means for maintaining conditions of desired relative pressure of different fluids within tank or reservoir B as will be readily understood. During the operation of the machine, furthermore, the supply of the bottle-filling-liquid to such tank or reservoir may also be automatically controlled by the employment of any suitable regulating mechanism connected with supply pipe b', intermediate of the machine and the barrel or keg with which such supply pipe may be connected. The operation of such regulating mechanism would, of course, be preferably made dependent upon the pressure of the air on the top of the liquid in the tank or reservoir B and suitable connections to effect such result would have to be supplied in addition to these here described; such controlling or regulating mechanism however, need not here be further described or illustrated inasmuch as it forms no part of my present invention.

The outer circular series of air charging tubes $b^{18}$ whose receiving ends are located in the upper portion of tank B are maintained free from foam or impurities brought or caused within said tank by the inner circular series of vent tubes $b^{12}$; such maintenance is obtained by the circular guard located between and concentric with said two series of tubes. Such guard consists, as has been described, of the perforated partition $b^{14}$; and the screen $b^{18}$ covering the perforations in such partition is adapted to permit free passage of air from the one portion to the other of the tank while still preventing the passage therethrough of the foam and other impurities with which said air may be connected or charged on the inner side of the guard. The pure air which emerges from the outer side of the guard is thereupon free to reënter the upper ends of the air-charging tubes $b^{13}$. The compressed air can thus be used in continuous rounds of operation; charging the empty bottles therewith through the passages that, at certain stages in the operation of the filling device, communicate with said tubes $b^{13}$, and being vented into the beer tank as such air is forced from out the bottles while the latter are being filled with beer, such venting taking place through other appropriate passages that communicate with vent tubes $b^{12}$. During such operation, simultaneously with the automatic control of such air pressure within the tank B by float $B^6$ and connected mechanism, such float is excluded from the foam or impurities within the tank B, by the circular screen $b^{11}$ wherewith it is inclosed about. Such screen $b^{11}$, like the partition $b^{14}$, extends sufficiently near to the bottom of the tank to be, at all times, below the level of the beer or other liquid in such tank whereby the foam or other impurities referred to are prevented from passing under the lower edge into the protected space.

It has been indicated that while perhaps the invention will find its greatest field of usefulness in the bottling of beer, it is equally adapted for the handling of other liquids. Accordingly, wherever the term beer may occur in the foregoing description or the following claims the same should be understood as including, under the rule of equivalents, any suitable fluid, as a known substitute for beer. So too the invention may be used to fill any suitable vessels; wherever the term bottle may occur in the foregoing description or the following claims the same should be understood as including, under the rule of equivalents, any suitable vessel, as a known substitute for the bottle. And while, for obvious present practical reasons, I have referred to the use of air for charging the empty bottles and for actuating the piston means for the movable bottle rests I should have it understood that wherever the term air may thus occur in the foregoing description or the following claims I mean to include any suitable fluid as a known substitute for air.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a bottle filling machine, bottle holding means comprising a bottle mouth-piece and a bottle rest movable relatively to said mouth-piece, said mouth-piece and rest having two conjoint movements distinct from such bottle rest movement, and from each other, and fluid pressure means adapted to automatically thus move said rest relatively to said mouth-piece upon one such conjoint movement.

2. In a bottle-filling machine, bottle holding means comprising a bottle mouth-piece, a bottle rest movable relatively to said mouth-piece, said mouth-piece and rest having conjoint oscillatory movement, and conjoint translatory movement and fluid pressure means adapted to automatically thus move said rest relatively to said mouth-piece upon such conjoint oscillatory movement.

3. In a bottle filling-machine, a plurality of conjointly movable bottle holding means each comprising a bottle mouth-piece and a fluid pressure bottle lift movable relatively to said mouth-piece, said mouth-piece and lift in each individual bottle holding means having conjoint movement distinct from such bottle lift movement and from the general conjoint movement of said bottle-holding means, and valve means adapted to automatically control the flow of fluid to each of said lifts upon the conjoint movement of the individual bottle holding means to which it belongs.

4. In a bottle-filling machine, a plurality of conjointly rotatable bottle-holding means each comprising a bottle mouth-piece, a fluid pressure bottle-lift reciprocatorily mounted relatively to said mouth-piece, said mouth-piece and lift in each individual bottle-holding means having conjoint movement distinct from such reciprocatory bottle-lift movement, and from the general conjoint rotative movement of said bottle-holding means, and valve means adapted to automatically control the flow of fluid to said lift upon such individual conjoint movement.

5. In a bottle-filling machine, a plurality of bottle-holding means each comprising a bottle mouth-piece, and a fluid pressure bottle-lift reciprocatorily mounted relatively to said mouth-piece, said mouth-piece and lift in each individual bottle-holding means having conjoint oscillatory movement, and valve means adapted to automatically control the flow of fluid to said lift upon such conjoint movement.

6. In a bottle filling machine, a plurality of bottle holding means each comprising a bottle mouth-piece and a fluid pressure bottle lift movable relatively to said mouth-piece, said mouth-piece and lift in each individual bottle holding means having conjoint oscillatory movement, and valve means adapted to automatically control the flow of fluid to said lift upon such conjoint movement.

7. In a bottle filling machine, bottle holding means comprising a bottle mouth-piece and a bottle rest, piston means adapted to move said bottle rest relatively to said mouth-piece, said mouth-piece and rest having conjoint oscillatory movement in a substantially vertical plane, and valve means adapted to automatically control the flow of fluid to said piston means upon such conjoint movement.

8. In a bottle filling machine bottle holding means comprising a bottle mouth-piece and a bottle rest; piston means for moving said bottle rest relatively to said mouth-piece, said mouth-piece and rest having conjoint oscillatory movement in a substantially vertical plane; valve means, and port means, one of the latter sharing, the other not sharing, in said conjoint movement and automatically coöperative during the same to control flow of fluid for said piston means.

9. In a bottle filling machine, bottle holding means comprising a bottle mouth-piece and a bottle rest, piston means adapted to move said bottle rest relatively to said mouth-piece, said mouth-piece and rest having conjoint oscillatory movement in a substantially vertical plane, valve means sharing, and port means not sharing, in said conjoint movement and automatically coöperative during the same to control flow of fluid for said piston means.

10. In a bottle filling machine, bottle holding means comprising a bottle mouth-piece and a bottle rest, piston means adapted to move said bottle rest relatively to said mouth-piece, said mouth-piece and rest having conjoint oscillatory movement in a substantially vertical plane, valve means rigid with said mouth piece and sharing in such conjoint movement, and port means not sharing in such movement, said valve and port means being automatically coöperative during the same to control the flow of fluid for said piston means.

11. In a bottle filling machine, the combination of a fluid distributing device, a bottle mouth-piece carried thereby and oscillatory with respect thereto, the connection of said mouth-piece with said device being controlled by such oscillatory movement, and positively movable means adapted to hold a bottle against such mouth-piece, the operation of said means likewise depending upon such oscillatory movement.

12. In a bottle filling machine, the combination of a fluid distributing device, a bottle mouth-piece carried thereby and oscillatory with respect thereto, the connection of said mouth-piece with said device being controlled by such oscillatory movement, and a fluid pressure bottle lift adapted to raise and hold a bottle against such mouth-piece, the operation of said lift being likewise controlled by such oscillatory movement.

13. In a bottle filling machine, the combination with a bottle mouth-piece, of a bottle rest movable relatively to said mouth-piece, said mouth-piece and rest having two conjoint movements distinct from such bottle rest movement and from each other, and means respectively adapted upon one such conjoint movement to automatically operate said rest to raise a bottle placed thereon against said mouth-piece and thereupon to fill such bottle.

14. In a bottle filling machine, the combination with a bottle mouth-piece, of a bottle rest movable relatively to said mouth-piece, said mouth-piece and rest having conjoint oscillatory movement, and means normally inoperative but respectively adapted upon such conjoint movement to automatically operate said rest to raise a bottle placed thereon against said mouth-piece and thereupon to fill such bottle.

15. In a bottle filling machine, the combination with a bottle mouth-piece, of a bottle rest movable relatively to said mouth-piece, said mouth-piece and rest having conjoint oscillatory movement in a substantially vertical plane, and means normally inoperative but respectively adapted upon such conjoint movement to automatically operate said rest to raise a bottle placed thereupon against said mouth-piece and thereupon to fill such bottle.

16. In a bottle filling machine, the combination with a bottle mouth-piece, of a fluid pressure bottle lift movable relatively to said mouth-piece, said members having conjoint oscillatory movement and valve means respectively adapted to control the flow of fluid to said lift and to fill a bottle placed thereon, operation of said valve means being directly controlled by such conjoint movement.

17. In a bottle filling machine, the combination with a bottle mouth-piece, of a fluid pressure bottle lift movable relatively to said mouth-piece, said mouth-piece and lift having conjoint oscillatory movement in a substantially vertical plane, and valve means respectively adapted upon such conjoint movement to automatically control the flow of fluid to said lift and to fill a bottle placed thereon.

18. In a bottle filling machine, the combination with a bottle mouth-piece; a bottle rest; piston means for moving said bottle rest relatively to said mouth-piece, said mouth-piece and rest having conjoint oscillatory movement in a substantially vertical plane; valve means, and corresponding port means, one of the latter sharing, and the other not sharing, in said conjoint movement and respectively automatically coöperative during the same to control flow of fluid for said piston means and to fill a bottle placed upon said rest.

19. In a bottle filling machine, the combination with a bottle mouth-piece; a bottle rest; piston means for moving said bottle rest relatively to said mouth-piece, said mouth-piece and rest having conjoint oscillatory movement in a substantially vertical plane; a valve member sharing, and a port member not sharing, in said conjoint movement, and automatically coöperative during the same to control flow of fluid for said piston means and to fill a bottle placed on said rest.

20. In a bottle filling machine, the combination with a bottle mouth-piece; a bottle rest; piston means adapted to move said bottle rest relatively to said mouth-piece, said mouth-piece and rest having conjoint oscillatory movement in a substantially vertical plane; a valve member rigid with said mouth-piece and sharing in such conjoint movement; and a port member not sharing in such movement, said valve and port members being automatically coöperative during the same to control the flow of fluid for said piston means and to fill a bottle placed on said rest.

21. In a bottle filling machine, the combination of a supporting member including a valve plug having port means; a tubular valve fitted upon said plug so as to be rotatable thereabout; and a bottle mouth-piece, bottle rest, and piston means adapted to move said bottle rest relatively to said mouth-piece, all attached to said tubular valve and rotatable therewith, said valve and port means being coöperative during such rotation to control the flow of fluid for said piston means and to fill a bottle placed on said rest.

22. In a bottle filling machine, the combination of a bottle-filling-fluid reservoir; an actuating-fluid reservoir; a supporting member including a valve plug provided with passages respectively communicating with aforesaid reservoirs; a tubular valve fitted upon said plug so as to be rotatable with respect thereto; and a bottle mouth-piece, bottle rest, and piston means adapted to move said bottle rest relatively to said mouth-piece, all attached to said tubular valve and rotatable therewith, said valve being provided with passages communicating with said bottle mouth-piece, and piston means respectively, and respectively adapted to register during such rotation with the passages in said plug communicating with said bottle-filling-fluid, and actuating fluid reservoirs.

23. In a bottle filling-machine, the combination of a series of bottle mouth-pieces and corresponding bottle rests movable relatively thereto, each individual bottle mouth-piece and the corresponding rest having a conjoint movement distinct from said bottle rest movement and all of said mouth-pieces and rests being rotatable with respect to a common axis; and means controlled by such conjoint movement, adapted to automatically operate said rests, respectively.

24. In a bottle filling machine, the combination of a series of bottle mouth-pieces and corresponding fluid pressure bottle lifts movable relatively thereto, each of said bottle mouth-pieces and the corresponding lift having a conjoint oscillatory movement about a substantially horizontal axis, and all of said mouth pieces and lifts being rotatable with respect to a common vertical axis; and means adapted to automatically operate said lifts, respectively, upon such conjoint movement.

25. In a bottle filling-machine, the combination of a series of bottle mouth-pieces and corresponding bottle rests movable relatively thereto, each of said bottle mouth-pieces and the corresponding rest having a conjoint movement distinct from said bottle rest movement and all of said mouth pieces and rests being rotatable with respect to a common axis; and means, controlled by such conjoint movement, adapted to automatically operate each of said rests to raise a bottle placed thereon against the corresponding mouth-piece and to thereupon fill such bottle.

26. In a bottle filling machine, the combination of a series of bottle mouth-pieces and corresponding fluid pressure bottle lifts movable relatively thereto, each of said bottle mouth-pieces and the corresponding lift having a conjoint oscillatory movement about a substantially horizontal axis, and all of said mouth-pieces and lifts being rotatable with respect to a common vertical axis; and means adapted upon such conjoint movement to automatically operate each of said lifts to raise a bottle placed thereon against the corresponding mouth-piece and to thereupon fill such bottle.

27. In a bottle filling machine, the combination of a series of bottle mouth-pieces; corresponding bottle rests; piston means for moving each of said rests relatively to the corresponding mouth-piece, each related mouth-piece, rest and piston means having conjoint oscillatory movement about a substantially horizontal axis, and all of said mouth-pieces and rests being rotatable with respect to a common vertical axis; and valve means and port means corresponding with each of said mouth-pieces, the one sharing, the other not sharing in such conjoint movement of the latter, and automatically coöperative upon the same to control flow of fluid to the corresponding piston means and to fill a bottle placed upon the rest thereby actuated.

28. In a bottle-filling machine, the combination of a rotary fluid reservoir having a fluid distributing device, bottle-holding means carried by the latter and movable with respect to the same in a direction lying at an angle to a radius to the axis of said reservoir, and means adapted to automatically actuate said distributing device to fill a bottle upon movement of said holding means with respect to said device, such movement being simultaneously effective to rotate said reservoir, substantially as described.

29. In a bottle-filling machine, the combination of a rotary fluid reservoir having a fluid distributing device, bottle-holding means carried by the latter and movable with respect to the same in a direction lying at an angle to a radius to the axis of said reservoir, and means adapted to automatically actuate said holding-means upon movement of the same with respect to said device, such movement being simultaneously effective to rotate said reservoir, substantially as described.

30. In a bottle-filling machine, the combination of a rotary fluid reservoir having a fluid distributing device, a mouth-piece carried by the latter and movable with respect to the same in a direction lying at an angle to a radius to the axis of said reservoir, and means adapted to effect connection of said mouth-piece with said distributing device upon such movement of said mouth-piece, such movement being simultaneously effective to rotate said reservoir, substantially as described.

31. In a bottle filling machine, the combination of a rotary fluid reservoir having a fluid distributing device, said device including a pivotal support disposed with its axis intersecting the circle of rotary movement of said device, and a bottle mouth-piece carried by said support, the connection of said mouth-piece with said distributing device being controlled by such movement of said mouth-piece.

32. In a bottle filling machine, the combination of a fluid reservoir rotatable about a vertical axis and provided with a horizontally disposed fluid distributing device, and a bottle mouth-piece carried by the latter and oscillatory about a substantially horizontal axis intersecting the circle of rotary movement of said device, the connection of said mouth-piece with said distributing device being controlled by such oscillatory movement.

33. In a bottle filling machine, the combination of a rotary fluid reservoir having a fluid distributing device provided with a valve plug disposed with its axis intersecting the path of rotary movement of said device, said plug having port means, a tubular valve fitted upon said plug so as to be rotatable thereabout, and a bottle mouth-piece attached to said valve, said valve and port means being coöperative upon rotation of the former to control the connection of said mouth-piece with said distributing device.

34. In a bottle filling machine, the combination of a rotary fluid reservoir having a fluid distributing device, a bottle mouth-piece carried by the latter and movable about an axis intersecting the path of the latter's rotary movement, the connection of said mouth-piece with said distributing device being controlled by such movement of the former, and means adapted to hold a bottle against said mouth-piece, the operation of said means likewise depending upon such angular movement.

35. In a bottle filling machine, the combination of a rotary fluid reservoir having a fluid distributing device, a bottle mouth-piece carried by the latter and movable about an axis angular to the path of the latter's rotary movement, the connection of said mouth-piece with said distributing device being controlled by such angular movement, and a fluid-pressure bottle lift adapted to raise and hold a bottle against said bottle mouth-piece, the flow of fluid to said lift being likewise controlled by such angular movement.

36. In a bottle filling machine, the combination of actuating-fluid and bottle-filling-fluid reservoirs rotatable about a common axis, a distributing device carried by said reservoirs and provided with a valve plug angularly disposed with respect to the path of rotary movement of said device, said plug having port means communicating with said reservoirs, respectively, a tubular valve fitted upon said plug so as to be oscillatory thereabout, a bottle mouth-piece, a bottle rest, and piston means adapted to move said rest relatively to said mouth piece, said mouth-piece, rest and piston means being attached to said valve and conjointly oscillatory therewith, and said valve and the port means in said plug being automatically coöperative upon such oscillation to connect said reservoirs with said piston means and bottle mouth-piece respectively.

37. In a bottle filling machine, the combination of a rotatable upright shaft, actuating-fluid and bottle-filling-fluid reservoirs borne thereby, a distributing device also borne thereby and provided with a horizontally disposed valve plug lying at an angle to the path of movement of said device, said plug having passages communicating respectively with aforesaid reservoirs, a tubular valve fitted upon said plug so as to be oscillatory thereabout, a bottle mouth-piece, a bottle rest, and piston means adapted to move said rest relatively to said mouthpiece, said mouth-piece, rest, and piston means being attached to said valve and conjointly oscillatory therewith, and said valve being provided with passages communicating with said piston means and mouth-piece, respectively, and adapted upon such oscillation to register with the passages in said plug.

38. In mechanism of the class described, bottle supporting means including a reciprocable piston rod, a bottle rest carried thereby, and means adapted to lock said piston rod in different angular positions about its own axis.

39. In mechanism of the class described, bottle supporting means including a reciprocable piston rod, a bottle rest carried thereby, and means adapted to lock said piston rod in different angular positions about its own axis within the limits of its normal stroke.

40. In mechanism of the class described, bottle supporting means including a cylinder, a piston and piston rod reciprocable therein, a bottle rest carried by said piston rod, and inter-engaging elements borne by said cylinder and piston adapted to lock the latter in different angular positions about its own axis.

41. In mechanism of the class described, bottle supporting means including a cylinder, a piston and piston rod reciprocable therein, a bottle rest carried by said rod, and inter-engaging elements borne by said cylinder and piston adapted to lock the latter in different angular positions about its own axis within the limits of said piston's normal stroke.

42. In mechanism of the class described, bottle supporting means including a cylinder, a piston reciprocable therein, one of said members having a projection parallel with the rod of said piston, the other having a plurality of apertures respectively adapted to receive said projection and lock said piston against rotation in said cylinder, and a bottle-rest carried by the rod of said piston.

43. In mechanism of the class described, bottle supporting means including a cylinder, a piston reciprocable therein, one of said members having a projection parallel with the rod of said piston and the other a plurality of apertures respectively adapted to receive said projection and lock said piston against rotation within the limits of its normal stroke, and a bottle rest carried by the rod of said piston.

44. In mechanism of the class described, bottle supporting means including a cylinder, a piston reciprocable therein, one of said members having a projection parallel with the rod of said piston and the other a plurality of apertures respectively adapted to receive said projection and lock said piston against rotation within the limits of its normal stroke, and a plurality of bottle rests borne by the rod of said piston and adapted to be operatively positioned when said apertures are respectively thus engaged by said projection.

Signed by me, this 10th day of January, 1907.

JOSEPH H. CHAMP.

Attested by—
D. T. DAVIES,
JNO. F. OBERLIN.